No. 635,943. Patented Oct. 31, 1899.
F. S. D. SCOTT.
TILL AND MEANS FOR CHECKING CASH RECEIPTS.
(Application filed Dec. 6, 1897.)
(No Model.) 3 Sheets—Sheet 1.
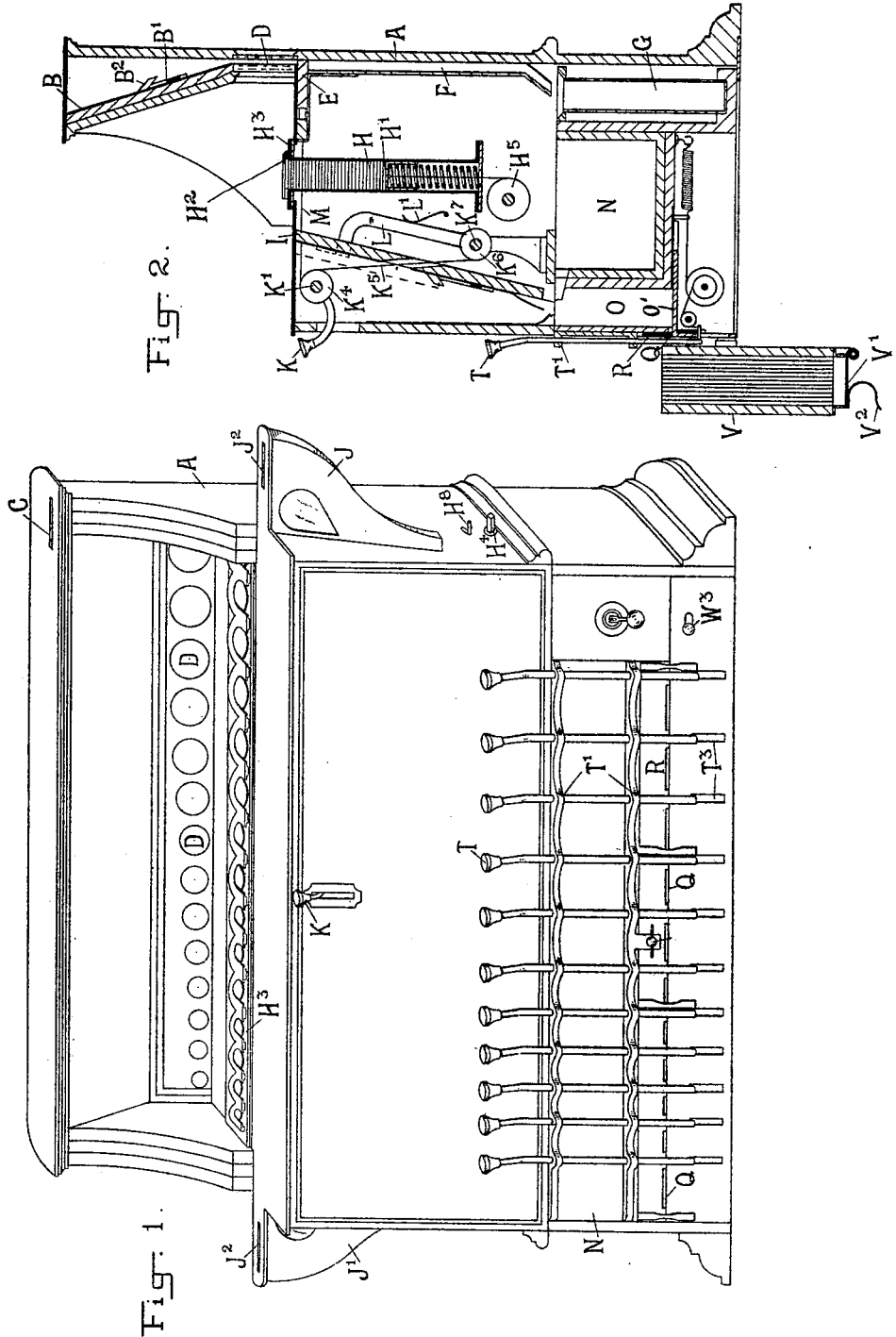
Witnesses
Inventor
Frank Septimus Demitrius Scott No. 635,943. Patented Oct. 31, 1899.
F. S. D. SCOTT.
TILL AND MEANS FOR CHECKING CASH RECEIPTS.
(Application filed Dec. 6, 1897.)
(No Model.) 3 Sheets—Sheet 2.
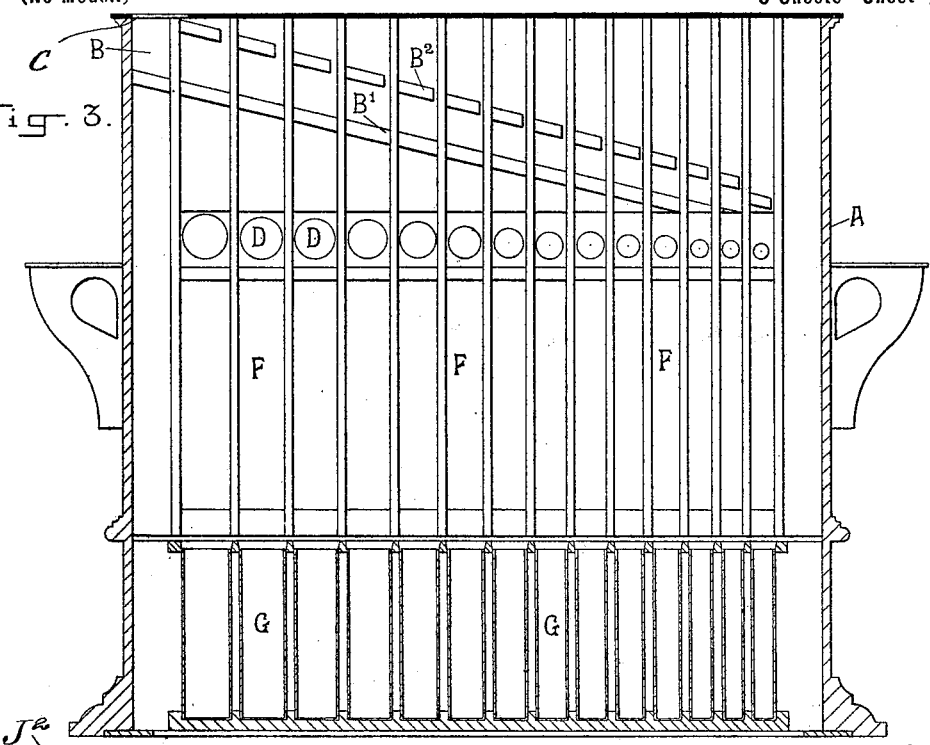
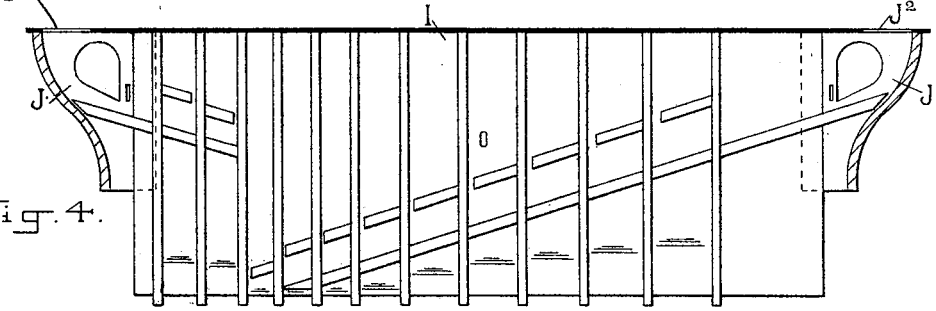
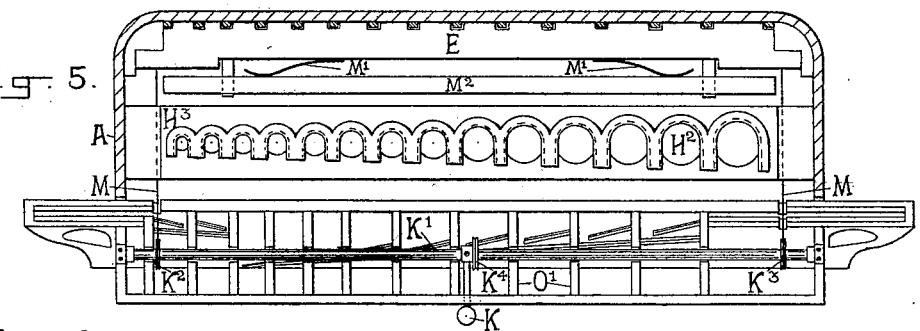
WITNESSES. INVENTOR.

No. 635,943. Patented Oct. 31, 1899.
F. S. D. SCOTT.
TILL AND MEANS FOR CHECKING CASH RECEIPTS.
(Application filed Dec. 6, 1897.)
(No Model.) 3 Sheets—Sheet 3.

WITNESSES. INVENTOR.

UNITED STATES PATENT OFFICE.

FRANK SEPTIMUS DEVONTEAUX SCOTT, OF LONDON, ENGLAND, ASSIGNOR TO THE GLOBE CASHIER, (BRITISH AND FOREIGN,) LIMITED, OF SAME PLACE.

TILL AND MEANS FOR CHECKING CASH RECEIPTS.

SPECIFICATION forming part of Letters Patent No. 635,943, dated October 31, 1899.

Application filed December 6, 1897. Serial No. 660,997. (No model.)

*To all whom it may concern:*

Be it known that I, FRANK SEPTIMUS DEVONTEAUX SCOTT, a subject of the Queen of Great Britain and Ireland, and a resident of 25 Upper Bedford Place, London, England, have invented certain new and useful Improvements in Tills and in Means for Checking Cash Receipts, of which the following is a specification.

This invention relates to money-tills; and it consists of certain improvements in the same and also in means therewith for checking cash receipts.

In order that the invention may be clearly understood, reference is made to the accompanying sheets of drawings, in which—

Figure 7:
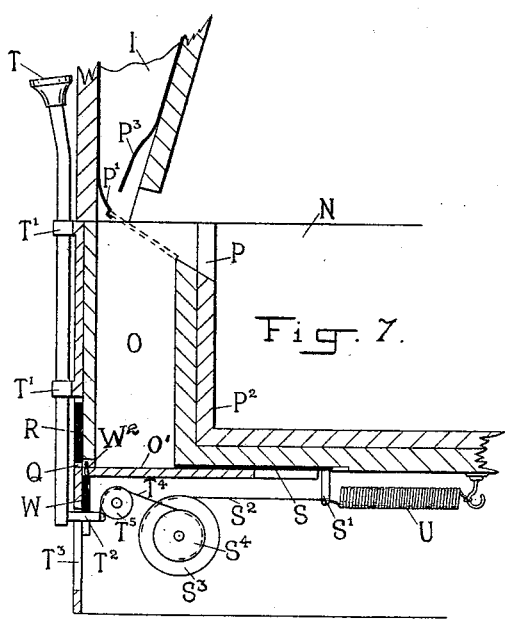
Figure 8:
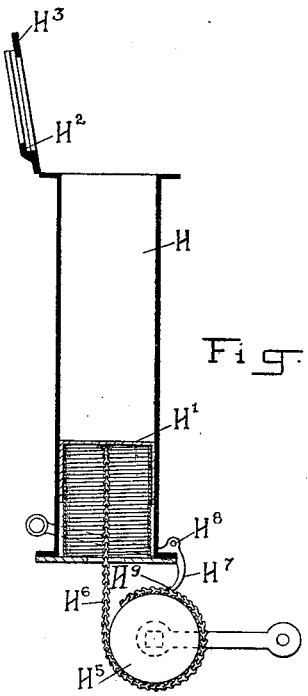
Figure 9:
Figure 12:
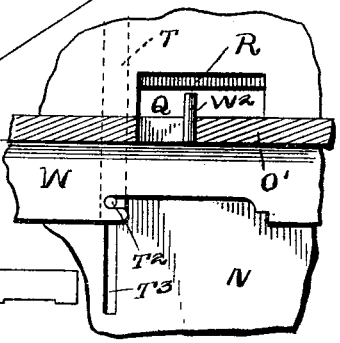
Figure 10:
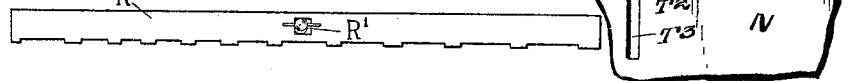
Figure 11:
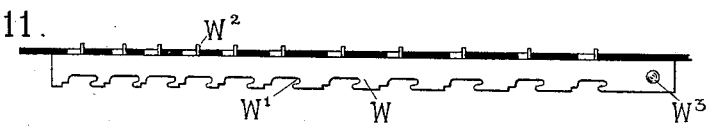

Figure 1 shows a perspective view of the apparatus. Fig. 2 is a transverse section of the same. Fig. 3 is a view of the check-assorter looking from the opposite side of the apparatus to that shown in Fig. 1. Fig. 4 is a view of the coin-assorter looking from the same side as Fig. 1. Fig. 5 is a plan of the apparatus, partly in section and having a portion of the cover-plate removed. Fig. 6 is a plan of the coin-assorter, showing the angle at which the diverting-strips are placed for turning the coins off the inclined rail. Fig. 7 is an enlarged sectional view showing one set of the coin-ejecting mechanism and also the means for regulating the amount of coins in the cavities or receivers. Fig. 8 is an enlarged sectional view through one of the check-holders, showing also the catch for retaining the spring-seat in its lowest position while the holder is being filled. Fig. 9 is a perspective view of the trough for receiving the coins ejected from the apparatus. Fig. 10 is a view of the bar for adjusting the size of the coin-slots. Fig. 11 is the locking-bar; and Fig. 12 is a rear elevation of a section of a receiver, showing the relation of the locking mechanisms.

In constructing an apparatus according to my present invention I form a suitably-shaped case A, of wood, metal, or other suitable material, and in the upper part of the said case I secure an assorter B, as shown in Figs. 2 and 3, for distributing a number of different-sized disk - checks, hereinafter explained. The said assorter consists, essentially, of a chute B', inclined downward in the direction of its length for causing the disks to travel along it and inclined slightly backward in a transverse direction to its length for causing the disks as they run to take a cant which prevents their swerving off the narrow path on which they travel until diverted therefrom by the strips B². These strips are arranged according to the sizes of the disks, which they severally select, so as to turn them off the said path in descending order according to size at suitable points thereof. The said disks are dropped through a slot C in the top of the casing onto the chute B', and after being assorted they fall into glass - paneled compartments D and are visible from both sides of the apparatus. Each denomination or size of disk has its respective compartment. In the lower portion of these compartments is a sliding shutter E, which forms the bottom of the said compartments and which is capable of being drawn back by suitable mechanism, hereinafter explained, to allow the disks to pass into the passage-ways F, leading to glass or other suitable tubes G, hereinafter described.

The disk-checks before mentioned may be of brass or other suitable material, and they are made in series of different-sized sets, each set forming part of the series, being marked with a figure corresponding to the amount of a purchase. Any suitable number of these sets may be used, and any suitable number of checks may constitute a set. The set having the largest-sized disks may be marked with, say, "1 cent" or other suitable figure, and they decrease in size, according to the increased amount named thereon, until the figure is high enough for the class of business in which the till is intended for use, or, if desired, the greatest amount may be marked on the largest disks. The said checks are stacked according to size in tubular holders, such as H, Figs. 2 and 8. These holders correspond in number to the series of disks used, and they are arranged in the most convenient position within the apparatus. Each of the said holders is provided with a spring-seat H' for forcing the disks upward, so that the top disk will bind against the projecting ledge H² of the plate H³, (in the manner of a sovereignpurse, for example,) in order that the said top disk will be at a level with the apparatus case and may be easily abstracted from the holder when required. To fill the said holders with disks, a suitable crank-handle is fitted onto the square end H$^4$, Fig. 1, of the rod, which carries the drum H$^5$, and by turning this handle a suitable distance chains similar to H$^6$, Fig. 8, connected with the seats H', are wound upon the drum H$^5$, so as to cause the said seats to be drawn down as far as possible, and when in this position a catch H$^7$ engages a tooth H$^9$ on the drum to prevent the said drum from moving until released. The plate H$^3$ at the top of the holders is then raised, and the disks are inserted in the said holders according to size and in their proper order. The plate H$^3$ is now closed upon the holders and fastened by a suitable lock, and the catch H$^7$, before mentioned, is disengaged from the drum by raising the knob H$^8$, which is attached to the said catch and which is movable in the slot formed in the side of the case. In addition to the figures on the said checks representing the amount of a purchase there is also on each of the checks in each set or denomination excepting the top one the total amount of the check or checks above it when stacked in its proper order in its holder H— that is to say, (as an example take the five-cent set,) the top check is simply marked "5 cents," the check under it is marked "10 cents," being the total of the two checks, the next is "15 cents," and so on—so that as the checks are withdrawn from the holders and passed into the glass tubes G the top check in each tube will represent the total of the checks below it, and the total of the amounts on these top checks should correspond with the cash receipts. Each set of checks may be colored different to the others in order that they can be easily distinguished.

In the lower portion of the apparatus is another assorter I, which is used for coins. This assorter is very similar to the one previously described, but has a double chute—one being for the silver, nickel, and copper and the other for gold coins. At the sides of the said assorter and communicating therewith are indicator-compartments J and J', into which the coins are dropped through the slots J$^2$ and J$^2$. These compartments are provided with glass windows, so that the coins placed therein are visible to the purchaser.

The simultaneous release of the coins in the indicator-compartments and also the disk-checks in the compartments D is caused by manipulating a small press-knob K, which is connected with a turnable rod K', on which are secured the pulley-wheels K$^2$, K$^3$, and K$^4$. To the pulley K$^4$ is fastened a cord or chain K$^5$, which is connected with a pulley K$^6$, mounted on a suitable rod K$^7$, upon which are also secured the bent arms similar to L, arranged at both ends of the apparatus to communicate with the interior of the indicator-compartments in order to prevent the coins rolling into the assorter until the mechanism is operated. A suitable spring L' is arranged at the back of each bent arm L to keep it in position. The pulleys K$^2$ and K$^3$ aforesaid have cords or chains M and M attached to them, and these connect with the shutter E before mentioned, so that when the press-knob K is actuated the said shutter will be drawn back clear of the compartments D to allow the checks to fall through into the passage-ways leading to the glass tubes G. The said shutter is immediately returned to its original position, when the knob K is released by means of the springs M' attached thereto and bearing on the rail M$^2$.

The entire lower portion of the case A is occupied by the sliding drawer N, in the front portion of which is a series of cavities or receivers corresponding in number to the variety of coins to be separated, so that each denomination of coin has its particular cavity. One of these cavities is shown in Figs. 2 and 7 and lettered O. They are each arranged just between the divisional blocks O' of the assorter I and are slightly larger in diameter than the coins they are intended to receive.

In order to prevent the assorter I from getting blocked should a greater number of coins be passed through the same than the cavities will hold, the upper portions of the said cavities or receivers are cut away or formed similar to P and a suitably-formed plate P', attached to the apparatus-case, projects partly over the said receivers in such a position that when the receivers are full the next coin entering either of the full cavities will be unable to fall flat into the same, but will be in an inclined position, resting between the edge of the cavity and the aforesaid plate, as shown by dotted lines in Fig. 7, until a coin below it is abstracted, in which case the top coin will immediately fall flat in position. Should, however, no coins be abstracted from the full cavities, the coins subsequently assorted will be diverted, by means of the inclined coin, into the removable tray P$^2$ of the drawer. The lower portion of the plate on the assorter I is bent similar to P$^3$ to direct the coins onto the projected portion of the plate P', so that they will be guided either into the receivers or into the tray, as above described. Slots similar to Q are formed in the front portion of the said drawer and communicate with the bottom O' of the cavities or receivers O, so as to allow the bottom coin in each cavity to be ejected. A metallic strip R is arranged above the slots Q to regulate their width, so that only one coin can pass through each time its respective ejector is operated, but should a bent coin be in one of the cavities and unable to pass through the limited opening the metallic strip can be raised by a suitable cam-and-lever device R', so as to increase the size of the opening and allow the coin to be easily ejected, after which the strip is readjusted to its normal position.

Each of the cavities or receivers is provided with a separate coin-ejector, which consists of a sliding bar S, arranged in suitable guides opposite the slot through which the coin is ejected and nearly level with the bottom of the cavity, so that when the sliding bar is brought forward it pushes the bottom coin in the cavity through the said slot. A stud S' is projected from the said bar and connects with one end of a cord or chain S², the other end of which is fastened to a wheel S³. This wheel is loosely mounted upon a spindle and is connected with another wheel S⁴ of a smaller diameter, hereinafter mentioned. The coin-ejectors are operated by means of the vertical press-knobs T, the stems of which are supported in suitable guides T' on the front of the drawer. A pin T² on each stem projects through an aperture T³ in the lower portion of the drawer and is connected with a chain or cord T⁴, which passes over the roller T⁵ and also connects with the wheel S⁴, before mentioned, so that by simply pressing down one of the knobs, say, one and fifty-five one-hundredths centimeters or thereabout the wheel S⁴ is caused to revolve or turn a corresponding distance, while the larger wheel S³, which is connected with the sliding bar S, is of such a circumference that this movement is sufficient to draw the sliding bar forward the required distance. When the knob is released, a spiral spring U, which connects with the sliding bar S, causes the said bar to return to its original position ready to be operated again.

The tubes G, before mentioned, for receiving the checks, Figs. 2 and 3, are arranged according to size in suitable supports at the back of the drawer N and are slightly larger than the disks which they are intended to receive.

A trough V, as shown in Figs. 2 and 9, is attached to the front of the drawer and is for the purpose of receiving the coins which are ejected from the cavities. It is furnished with a hinged flap V', which is retained in the closed position by a suitable spring. A lip or hook V² is formed at the free end of this flap, so that the operator can with one hand lower the said flap and obtain the coins.

A locking-bar W, Fig. 11, having notches W', is arranged at the back of the drawer-plate and is capable of engaging the pins T² on the lower end of the stems. The said bar is also furnished with the studs W², which project through suitable apertures into the coin-slots Q. When it is desired to lock the machine, the said bar is moved forward by means of the knob W³ or other suitable device and there fastened, in which case the notches will engage the pins aforesaid on the knob-stems at the same time the studs W² are moved across the slots Q to prevent the abstraction of any coins from the cavities.

The operation of the apparatus is as follows: In the first place it must be assumed that the till is charged with checks and also a sufficient sum for giving change when necessary. As an example, a purchase is made for a twenty-five-cent article and a half dollar tendered by the purchaser. The operator first obtains from the proper holder a check corresponding to the amount of a purchase—namely, twenty-five cents. This check is placed in the slot C to be assorted, after which it will appear in its proper compartment D. The coin tendered is then dropped into the indicator-compartment J through the slot J². The change—namely, twenty-five cents—is now obtained from the till by pressing down the knob T for the twenty-five-cent coin. This coin is ejected into the trough, and by lowering the spring-flap V' it slides into the hand and is given to the purchaser. The check representing the amount of the purchase and also the coin tendered are both on view in the apparatus and can be compared with the change. The purchase is now complete, and the check and also the coin are caused to simultaneously disappear by pressing down the knob K. The check after being released from its compartment D passes through the passage-way F into the glass tube G, while the coin passes into the assorter I and is diverted into its proper receiver O in the drawer. Say, for instance, that the drawer N is now taken out to examine the contents, it will be seen that the purchase according to the check in the tube amounted to twenty-five cents. Then there must be a corresponding sum in cash in addition to the amount placed in the apparatus at starting. Supposing that a number of purchases have been made, the total amount in the till can be easily ascertained by adding together the totals on the top checks in the glass tubes G. This should correspond with the cash receipts.

Having now described my invention, what I claim as new, and desire to secure by Letters Patent, is—

1. In a device of the character described, a check-holder comprising a casing, a spring-pressed seat located within the casing, a movable plate hinged to one end of the casing and provided with an opening having overhanging ledges adapted to retain the checks against the pressure of the seat but permitting their being removed by sliding them along the ledges, a chain connected to the seat and passing through the other end of the casing, a drum to which the chain is connected for retracting the seat to recharge the casing, a catch adapted to engage the drum and hold same stationary during the recharging operation, and means for releasing the catch, as and for the purpose described.

2. In a device of the character described, a chute, a receiver located therebeneath to receive disks from the chute, and a plate projecting partly over the receiver adapted to support a disk in an inclined position over the mouth of the receiver when the receiver becomes filled so as to divert the succeeding disks from the receiver, substantially as described.

3. In a device of the character described, a chute, a receiver located therebeneath to receive disks from the chute, said receiver being provided with a beveled edge wall, a tray in juxtaposition to the beveled edge wall of the receiver, and a plate projecting partly over the receiver so that when the receiver becomes filled the next disk will rest in an inclined position on the plate and the beveled edge of the receiver to divert the succeeding disks from the receiver into the tray, substantially as described.

4. In a device of the character described, a receiver having a slot in its lower end forming a passage-way, means for ejecting the contents of the receiver through the passage-way, a slidable operating-stem connected to said ejecting means, a movable locking-bar mounted beneath the receiver and provided with a notch for engaging and locking the operating-stem, and a stud projecting from the locking-bar through an aperture of the receptacle to obstruct the passage-way simultaneously with the locking of the operating-stem, substantially as described.

5. In a device of the character described, a chute to receive a check indicating the amount of purchase, a transparent compartment into which the check is conveyed by the chute, a sliding shutter normally closing the bottom of the compartment, a transparent receptacle for the coins tendered, a spring-pressed arm suitably pivoted to normally close the outlet of the receptacle, a pulley connected to the arm, a suitably-pivoted press-knob, a pulley connected to said press-knob, and means for connecting the shutter and the first-named pulley with the second-named pulley, substantially as described.

In witness whereof I have hereunto set my hand in presence of two witnesses.

FRANK SEPTIMUS DEVONTEAUX SCOTT.

Witnesses:
W. D. ROWLINGSON,
J. WYETH.